Patented June 4, 1940

2,203,597

UNITED STATES PATENT OFFICE 2,203,597

BOX TOE MATERIAL

Henry B. Morse, Binghamton, and Walter S. Cornell, Endicott, N. Y., assignors to Endicott Johnson Corporation, Endicott, N. Y., a corporation of New York No Drawing. Application May 16, 1938, Serial No. 208,310

6 Claims. (Cl. 91—70)

Our invention is an improved material especially adapted for use in making box toe stiffeners for shoes. Ordinarily, box toe stiffeners are composed of felt or fabric impregnated with a thermoplastic material which will render the stiffener hard when cold, but which is capable of being softened by heat.

The objects of our invention are to produce a thermoplastic blend of materials which when used to impregnate felt or any other textile fabric can be softened by the application of moderate heat, such as is commonly used in the handling of thermoplastic box toes in shoe manufacturing, but which will upon cooling form a hard but resilient box toe, conforming to the shape of the last. Another object is to produce a thermoplastic filler which while readily softened by the heat usually applied at the lasting operation will not become fluid and flow when subjected to the pressure applied when the shoe is lasted. This flow of fluidity of the thermoplastic filler is common to box toe stiffeners containing the materials generally used such as rosin, shellac, pitch, asphalt, montan wax and various other resins, waxes, etc.

Our stiffening material in brief comprises a base such as fabric or felt as commonly employed for this purpose, impregnated with a mixture of thermoplastic material such as montan wax, "Vinsol" (comprising gasoline insoluble oxidized resin acids, oxidized terpenes, polyphenols and polymerized terpenes remaining as a residue after the separation of refined rosin from the crude resinous material obtained by extraction of pine wood), as described in U. S. Patent No. 2,094,709, dated October 5, 1937, rosin, asphalt, and other natural or synthetic resins such as copal, kaurie or the like, together with a thermoplastic chemical derivative of crude rubber consisting of the reaction product of crude rubber, beta naphthol, sulphuric acid and trioxy methylene, mixed together in substantially the following proportions:

| | Pounds |
|---|---|
| Crude rubber | 200 |
| Beta naphthol | 20 |
| Sulphuric acid | 8 |
| Trioxy methylene | 3 lbs. 5½ oz. |

The said rubber derivative is made as follows: The crude rubber is placed in a Banbury mixer at a temperature of approximately 90 degrees F., cooling water running through the jacket of the machine. After running the mixer for about one minute, the beta naphthol is added. After about five minutes total running time, the temperature will have risen to approximately 130 degrees F., at which time the sulphuric acid is added. The temperature will thereupon rise approximately 10 more degrees F., and then drop from 10 to 20 degrees. After fourteen to fifteen minutes the temperature will start to rise rapidly indicating that the chemical reaction has commenced. At this time the water should be diverted from the jacket of the mixer and the temperature will rise to approximately 210 degrees F., at the end of seventeen or eighteen minutes and then start to drop. After eighteen minutes mixing, the trioxy methylene is added. The temperature will then fluctuate up and down 10 or 15 degrees F. After twenty-four minutes total mixing, the water is again circulated through the jacket of the mixer. At the end of 30 minutes total mixing, the batch is run into sheets of about 8 iron or .165 and permitted to cool. No claim is made to the above rubber derivative per se, which will hereinafter be termed "Isolac."

One method of producing our novel stiffeners is as follows: We prepare a mixture of the thermoplastic materials and thermoplastic rubber derivative (Isolac) in the following proportions:

| | Per cent by weight |
|---|---|
| Isolac | 13.5 |
| Rosin | 43.3 |
| "Vinsol" | 10.8 |
| Balata resin | 16.2 |
| Montan wax | 16.2 |
| | 100.0 |

The Isolac is dissolved in hexane, gasoline, or other suitable solvent so that an approximately 20% solution results. To this solution add a previously fused mixture of the following thermoplastic materials: rosin 50%, Vinsol 12.5%, montan wax 18.75%, and balata resin 18.75% by weight, making a final impregnating solution of approximately 65% solids and 35% solvent. We preferably heat the Isolac solution to about 120 degrees F. during the mixing to facilitate the incorporation of the fused mixture of thermoplastic materials therein, and the solution should be agitated during the addition of the fused thermoplastic materials, and agitation continued until the mixture is thoroughly incorporated in a uniform solution or suspension.

The base, such as felt or fabric or the like, which is highly absorbent, is then impregnated with the aforesaid hot mixture and the solvent evaporated from the impregnated base by drying.

The above proportions of thermoplastic ingredients may be varied as desired depending upon the desired characteristics of the product; for instance, we have found that the following proportions also give good results:

| | Per cent by weight |
|---|---|
| Isolac | 20.0 |
| Rosin | 36.8 |
| "Vinsol" | 10.8 |
| Balata resin | 16.2 |
| Montan wax | 16.2 |
| | 100.0 |

Another method of making shoe stiffeners using the above described Isolac is to make a thermoplastic mixture of said Isolac and other thermoplastic materials such as montan wax, asphalt, rosin, and other natural or synthetic resins such as copal, kaurie, ester gum and the like. We have found that desirable results are obtained when using—

| | Per cent by weight |
|---|---|
| Isolac | 10-20 |
| Asphalt | 30-40 |
| Montan wax | 40-50 |
| Rosin | 10-20 |

These percentages, however, may be varied as desired, depending upon the characteristics of the product.

The above ingredients are put in a tank heated to approximately 400 degrees F. and mixed and stirred until the ingredients are thoroughly blended. The base such as a web of felt, fabric or like absorbent material is passed through this heated mixture in the tank, and then passed through squeeze rolls to remove surplus thermoplastic material after which the base is passed over cooling rolls. The web of impregnated base is then cut into sheets, of convenient size, from which stiffener blanks may be cut. When it is desired to use the stiffener blanks they are heated, preferably by subjecting them to steam heat, and placed in the shoe. The shoe is then lasted and the blanks when cooled will conform with the shape of the last.

By reason of the comparatively slow hardening of our improved stiffeners after heating, the toes of shoes can be properly shaped before the stiffeners become set; whereas stiffeners now employed harden so quickly that the appearance of the shoe is frequently impaired.

Our novel box toe stiffeners, while sufficiently stiff when cold and unaffected by normal temperatures, are so flexible that they will not crack when bent through rather a sharp angle; and if distorted by a blow will give instead of break; and same possess sufficient resiliency so that they will resume their shape if distorted by ordinary pressure.

We claim:

1. A normally stiff thermoplastic box toe material adapted to be softened by heat, comprising an absorbent base impregnated with a thermoplastic material consisting of the heat reaction product of a mixture of unvulcanized crude rubber with approximately 10% by weight of beta naphthol and approximately 4% of sulphuric acid, treated with approximately 1.75% of trioxymethylene; and other thermoplastic materials including a natural resin, and a natural wax.

2. A normally stiff thermoplastic box toe material adapted to be softened by heat, comprising an absorbent base impregnated with a thermoplastic material consisting of the heat reaction product of a mixture of unvulcanized crude rubber with approximately 10% by weight of beta naphthol and approximately 4% of sulphuric acid, treated with approximately 1.75% of trioxymethylene; and other thermoplastic materials including asphalt, a natural resin, and a natural wax.

3. A normally stiff thermoplastic box toe material adapted to be softened by heat, comprising an absorbent base impregnated with a thermoplastic material consisting of the heat reaction product of a mixture of unvulcanized crude rubber with approximately 10% by weight of beta naphthol and approximately 4% of sulphuric acid, treated with approximately 1.75% of trioxymethylene; and other thermoplastic materials including a natural resin, a natural wax, and oxidized gasoline insoluble resin acids, oxidized terpenes, polphenols, and polymerized terpenes remaining as a residue after the separation of a refined rosin from the crude resinous material obtained by extraction of pine wood.

4. A normally stiff thermoplastic box toe material adapted to be softened by heat, comprising an absorbent base impregnated with a thermoplastic material consisting of the heat reaction product of a mixture of unvulcanized crude rubber with approximately 10% by weight of beta naphthol and approximately 4% of sulphuric acid, treated with approximately 1.75% of trioxymethylene; and other thermoplastic materials selected from the group consisting of asphalt, rosin, balata resin, and montan wax, and oxidized gasoline insoluble resin acids, oxidized terpenes, polphenols and polymerized terpenes remaining as a residue after the separation of a refined rosin from the crude resinous material obtained by extraction of pine wood.

5. A normally stiff thermoplastic box toe material adapted to be softened by heat, comprising an absorbent base impregnated with about 13.5%-20% by weight of a thermoplastic material consisting of the heat reaction product of a mixture of unvulcanized crude rubber with approximately 10% by weight of beta naphthol and approximately 4% of sulphuric acid, treated with approximately 1.75% of trioxy-methylene; and other thermoplastic materials including about 36.8%-43.3% of rosin, about 16.2% of balata resin, about 16.2% of montan wax, and about 10.8% of oxidized gasoline insoluble resin acids, oxidized terpenes, polphenols and polymerized terpenes remaining as a residue after the separation of a refined rosin from the crude resinous material obtained by extraction of pine wood.

6. A normally stiff thermoplastic box toe material adapted to be softened by heat, comprising about 10-20% of a thermoplastic material consisting of the heat reaction product of a mixture of unvulcanized crude rubber with approximately 10% by weight of beta naphthol and approximately 4% of sulphuric acid, treated with approximately 1.75% of trioxy-methylene; and other thermoplastic materials including about 30-40% by weight of asphalt, about 40-50% of montan wax, and about 10-20% of rosin.

HENRY B. MORSE.
WALTER S. CORNELL.